United States Patent Office 3,516,433
Patented June 23, 1970

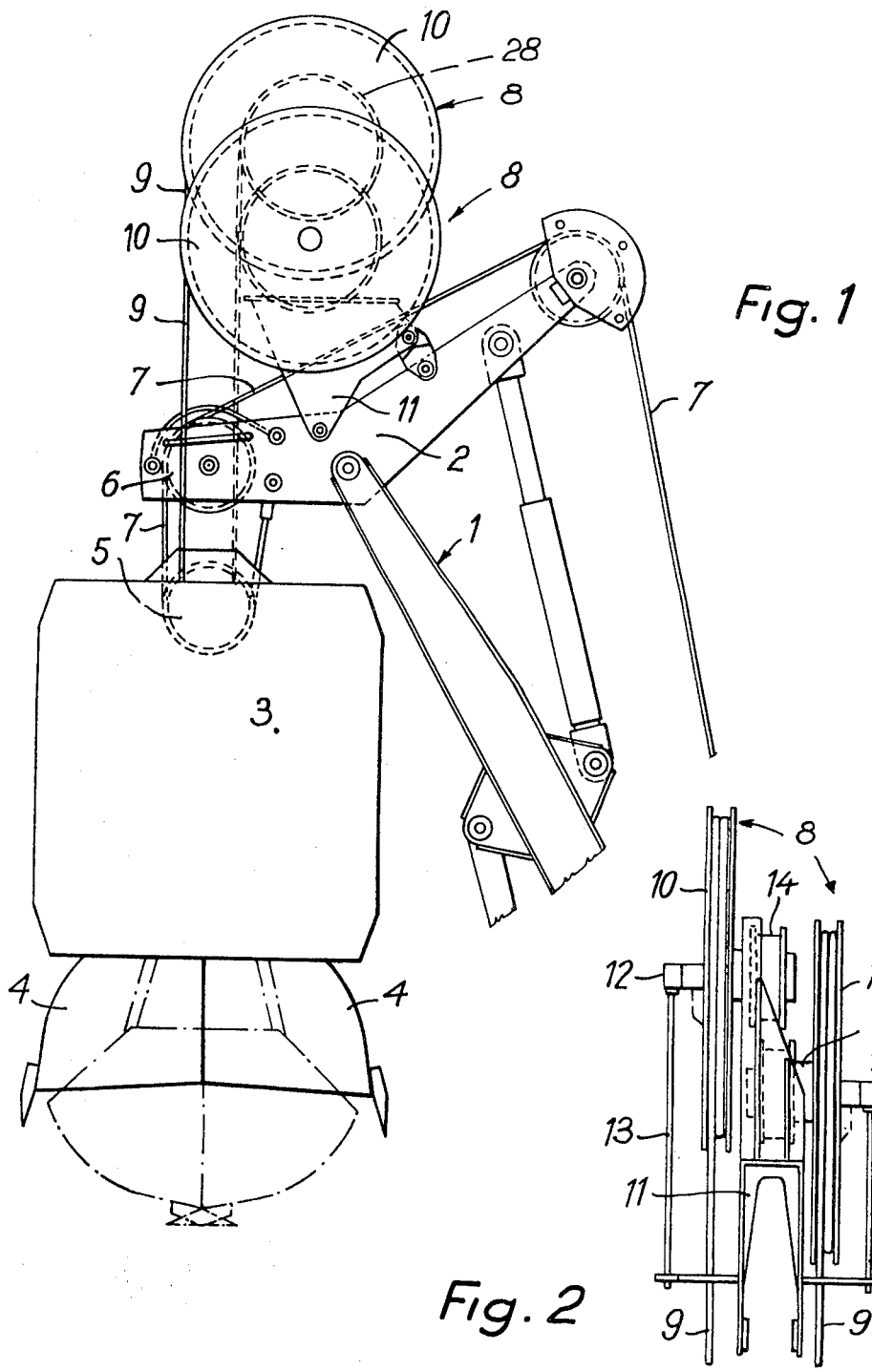

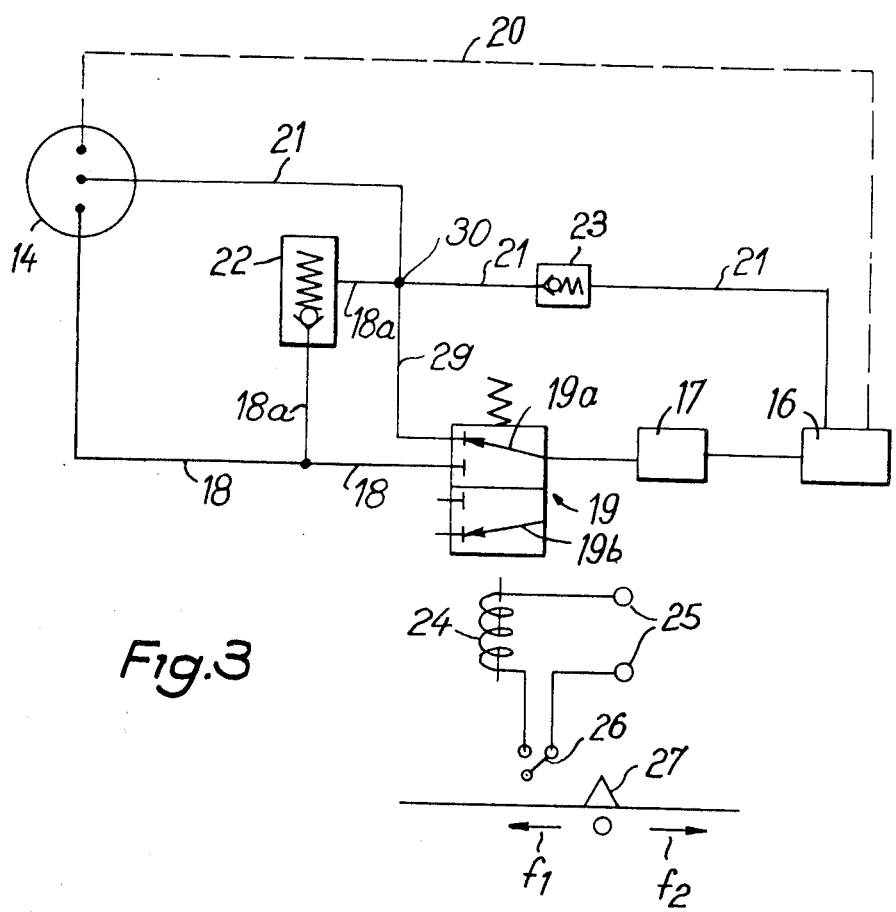

3,516,433
DEVICE FOR WINDING FLEXIBLE TUBING
CARRYING FLUID UNDER PRESSURE
Gabriel L. Guinot, Le Plessis-Belleville, Oise, France, assignor to Societe Anonyme Poclain, Le Plessis-Belleville, Oise, France, a society of France
Filed June 25, 1968, Ser. No. 739,858
Claims priority, application France, June 26, 1967, 112,213
Int. Cl. B65h 75/34
U.S. Cl. 137—355.26        2 Claims

ABSTRACT OF THE DISCLOSURE

A method of winding and unwinding a flexible fluid line on a drum rotatably mounted on a fixed support with respect to which a fluid actuated means supplied by the tubing is movable, the drum being operatively associated with rotary driving and braking means, in which method said driving and braking means apply a constant tension to the fluid line between the drum and movable receiver. Also included is a device for carrying out the method of the invention.

---

The present invention relates to the transmission by flexible fluid lines of hydraulic or pneumatic power between a main power source and at least one receiver such as a hydraulic cylinder assembly, a hydraulic motor, etc.

The problem which generally arises is that of making a connection between a main hydraulic or pneumatic power source which is fixed and a movable element such as a grab or bucket having element actuated by a fluid under pressure and subject to movement controlled by an external device (cable, rod linkage, etc.).

An object of the invention is to provide an extensible and controlled connection enabling the aforesaid problem to be solved.

According to the invention, a method of winding a flexible fluid line for feeding a fluid actuated device with fluid under pressure by means of a drum rotatably mounted on a fixed support with respect to which the fluid actuated device is movable, the drum being coupled to rotary driving means and braking means, is characterised in that the means for rotatably driving and braking the drum applies a constant tension to the flexible fluid line between the drum and the movable fluid actuated device.

From another aspect, the invention provides a device for carrying out the aforesaid method and comprising a drum rotatably mounted on a fixed support and coupled to a hydraulic motor, the drum supporting a flexible fluid line for feeding a hydraulic cylinder assembly or motor which is movable with respect to the fixed support, a two-way flow selector interposed between the source of fluid under pressure and the motor and whose control is dependent upon the direction of displacement of the fluid actuated device with respect to the winding device, a calibrated valve being disposed in the conduit delivering the fluid during unwinding of the fluid line, and a valve calibrated to operate at a pressure less than that of the first valve being disposed in the conduit delivering the fluid during winding of the pipe, the two conduits having a common point located downstream of the first valve and upstream of the second.

In order that the invention may be more fully understood, one embodiment in accordance therewith will now be described, by way of example, with reference to the accompanying drawings, in which:

FIG. 1 is a partial side view of a winding device of the invention mounted on a crane;

FIG. 2 is a view from the left of the winding device of FIG. 1;

FIG. 3 is a diagram representing the control circuit of the hydraulic motor of one of the drums of the winding device of FIG. 2.

Referring to the drawings, FIG. 1 partially shows the boom 1 of a crane, equipped at its end with a beam 2 supporting a grab 3 whose two scoops 4 are actuated by a double acting hydraulic cylinder assembly (not shown).

The grab 3 is connected to the beam 2 by means of a block and tackle whose movable pulley 5 is fixed to the grab 3 and whose fixed pulley 6 is rigid with the beam 2, the driving cable 7 of the block and tackle being connected to a hydraulic winch (not shown).

Two devices 8 are mounted on the beam 2 for winding the flexible fluid lines 9 which feed the two chambers of the double acting piston controlling the scoops 4 of the grab 3 with hydraulic fluid under pressure.

The winding devices 8 are absolutely identical and constituted by two drums 10 mounted on a support 11 fixed to the beam 2 (see also FIG. 2).

The fluid lines 9 are wound on the drums 10, the ends of the pipes being connected to rotatable joints 12, which are themselves connected to a main fixed hydraulic power source (not shown) by a conduit 13.

The rotatable joints 12 are disposed on the outer faces of the drums 10, on the other faces of which are mounted hydraulic driving motors 14. The drums 10 are staggered in such a way that the hydraulic motors 14 are substantially side by side so that the flexible fluid lines 9 are not too far from one another.

FIG. 3 is a diagram of one embodiment of the control circuit of a hydraulic motor for driving a winding drum.

This control circuit of the hydraulic motor 14 comprises a hydraulic fluid reservoir 16 connected to a pump 17. The pump 17 delivers into a flow selector 18 having two paths 19a and 19b and being electromagnetically controlled. Two main conduits connect the motor 14 to the remainder of the installation. The conduit 18 leaves the selector 19 and the conduit 21 leads to the reservoir 16, these two conduits constituting the main conduits. Leading from 18 is a conduit 18a in which is interposed a calibrated valve 22. A valve 23 is interposed in 21 and calibrated to operate at a pressure lower than that of the valve 22. The conduits 18a and 21 have a common point 30, located beyond the calibrated valve 22, but between the motor 14 and the valve 23. A conduit 20 connects the motor 14 again to the reservoir 16.

One of the paths 19a of the selector 18 is adapted, as shown in FIG. 3, to place the pump 17 in communication with the conduit 21 through a conduit 29 which leads to the point 30.

Finally, the circuit includes a control winding 24 for the movable element of the selector 18, which winding is connected to a current source 25 and in the supply circuit of which is inserted a movable contact 26 adapted to be actuated by a movable abutment 27 coupled to the control of the hydraulic jack of the grab. It will be understood that in the case of the double acting jack of the device shown in FIG. 1, the control circuit of FIG. 3 includes two hydraulic motors identical to the motor 14 and connected strictly in parallel from the three conduits 18, 20 and 21.

The operation of the winding device is as follows:

When the grab 3 is moving two things can happen:

(a) The grab 3 moves towards the winding device. The abutment 27 is moved to the left in the direction of the arrow $f_1$ and the contact 26 is closed. The path 19b of the selector 19 is then in operation and places the pump 17 in communication with the conduit 18 so that the motor 14 is supplied. The flow through the pump 17 is chosen so that the tangential speed of the fluid line 9 on its smallest winding radius (in broken lines 28 in FIG. 1) is equal to or greater than the maximum speed of the grab 3. The pressure in the conduit 18 is limited by the valve 22 to a value such that the torque which results from its application to the motor 14 corresponds to a tangential force at least equal to the weight of fluid line 9 used.

Under these conditions, as soon as the end of the fluid line 9 moves, the drum winds the latter with constant torque, the excess fluid flow returning to the reservoir 16 through the valve 23.

(b) The grab moves away from the winding device. The abutment 27 is moved towards the right in the direction of the arrow $f_2$ and the contact 26 is opened. The path 19a of the selector 19 is used in this case. The motor 14 acts as a power generator, the tangential force on the drum 10, resulting from the weight of the fluid line 9, driving the motor 14 in rotation. The fluid is taken in along 21 at a pressure equal to the calibration pressure of the valve 23 and is delivered into the conduit 18, in which prevails the calibration pressure of the valve 22. The excess fluid returns to the reservoir through the valves 22 and 23.

In the two foregoing cases of operation, a small fluid flow escapes from the motor, this flow being due to leaks which are collected by the conduit 20, which returns them to the reservoir 16.

Moreover, the various chambers of the motor 14 are always supplied under pressure through the valves 22 and 23. The valve 22 maintains a constant pressure in 18, while the valve 23 maintains a constant pressure in 21. In this way, "forced feeding" of the motor 15 is carried out.

When the grab 3 remains at a constant distance from the winding device, the drums 10 are immobilised. In effect, the selector 19 is then in the position shown in FIG. 3 and the motor 14 is only fed, but is no longer driven by the weight of the fluid line, as in the foregoing case (b), since the fluid line remains immobile, the grab having no relative movement whatsoever with respect to the winding device.

The present invention is not limited to the embodiments described and shown above, but covers all variants thereof and in general manner can be applied to any movable element connected by a cable, rod linkage or other means and having a device driven by a fluid under pressure. This device may be a single or double acting receiver or any device necessitating several power or control passages. It is is then sufficient to form a bundle of fluid lines and to use a rotatable joint having a number of passages corresponding to the number of fluid lines.

What is claimed is:

1. In an apparatus having a support means, an extensible and retractable working tool operatively mounted on said support means and having a fluid actuated means movable therewith for operating said working tool, a device for feeding and retracting at least one flexible fluid line operatively connected to said fluid actuated means comprising a rotatable drum mounted on said support means on which said fluid line may be wound and unwound, a fluid motor drivingly connected to said rotatable drum, a source of fluid under pressure, a two-way selector valve, a first fluid line intercommunicating said fluid source and the inlet of said selector valve, a second fluid line intercommunicating an outlet of said selector valve and said fluid motor, a third fluid line intercommunicating a second outlet of said selector valve and said fluid motor whereby said selector valve may be actuated to selectively communicate said first fluid line with said second or third fluid lines, a fourth fluid line intercommunicating said second fluid line and a fluid reservoir for said source of fluid under pressure, said fourth fluid line having first and second check valves, said first check valve being calibrated to open at a higher pressure than said second check valve, the portion of said fourth fluid line between said check valves communicating with said third fluid line, and said selector valve being actuable responsive to the extending and retracting movements of said working tool to correspondingly communicate said first fluid line with said second and third fluid lines.

2. In an apparatus having a support means, an extensible and retractable tool operatively mounted on said support means and having a fluid actuated means movable therewith for operating said working tool, a device for feeding and retracting at least one flexible fluid line operatively connected to said fluid actuated means according to claim 1, wherein said selector valve is operated by a spring loaded solenoid having an electrical supply circuit, and said electrical supply circuit is provided with a contact switch engageable and thereby actuated by an abutment movable correspondingly to the movement of said working tool.

References Cited

UNITED STATES PATENTS

| | | | |
|---|---|---|---|
| 726,580 | 4/1903 | Shannon | 137—355.21 XR |
| 1,740,748 | 12/1929 | Read | 137—355.26 XR |
| 2,196,649 | 4/1940 | Waite | 212—44 |
| 2,382,955 | 2/1945 | Billings | 212—44 XR |
| 3,378,158 | 4/1968 | Lopez | 254—172 XR |
| 3,395,723 | 8/1968 | Tatsuno | 137—355.22 |
| 3,396,747 | 8/1968 | Moore | 137—355.21 |
| 3,443,698 | 5/1969 | Lopez | 254—184 XR |

SAMUEL SCOTT, Primary Examiner

U.S. Cl. X.R.

137—355.21; 212—44